United States Patent
Johnston et al.

(10) Patent No.: US 11,928,650 B2
(45) Date of Patent: *Mar. 12, 2024

(54) ENABLING SPONTANEOUS SOCIAL ENCOUNTERS IN ONLINE OR REMOTE WORKING ENVIRONMENTS

(71) Applicant: Cisco Technology, Inc., San Jose, CA (US)

(72) Inventors: Jay Kemper Johnston, Raleigh, NC (US); David C. White, Jr., St. Petersburg, FL (US); Magnus Mortensen, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,142

(22) Filed: Mar. 30, 2023

(65) Prior Publication Data

US 2023/0245072 A1 Aug. 3, 2023

Related U.S. Application Data

(63) Continuation of application No. 17/324,562, filed on May 19, 2021, now Pat. No. 11,663,559.

(51) Int. Cl.
*G06Q 10/1093* (2023.01)
*G06F 16/9035* (2019.01)
*G06F 16/9038* (2019.01)

(52) U.S. Cl.
CPC ..... *G06Q 10/1095* (2013.01); *G06F 16/9035* (2019.01); *G06F 16/9038* (2019.01)

(58) Field of Classification Search
CPC ........ G06F 1/00–2123/00; G06Q 10/00–50/00
USPC .................................................. 705/7.11–7.42
See application file for complete search history.

(56) References Cited

U.S. PATENT DOCUMENTS

| | | | | |
|---|---|---|---|---|
| 7,747,458 | B2* | 6/2010 | Lyle | G06Q 10/1093 |
| | | | | 705/7.19 |
| 8,793,314 | B2* | 7/2014 | Spivak | G06F 16/9535 |
| | | | | 709/204 |
| 8,881,244 | B2* | 11/2014 | Bhogal | G06F 21/6218 |
| | | | | 713/193 |
| 10,198,775 | B2* | 2/2019 | Lobb | G06Q 50/01 |
| 2009/0222747 | A1* | 9/2009 | May | G06Q 10/109 |
| | | | | 715/764 |
| 2009/0307610 | A1* | 12/2009 | Ryan | H04N 7/173 |
| | | | | 715/756 |

(Continued)

*Primary Examiner* — Alan S Miller
(74) *Attorney, Agent, or Firm* — Edell, Shapiro & Finnan, LLC (57) ABSTRACT

A meeting system facilitates spontaneous social encounter between users with a meeting server. The meeting server obtains calendar data, user preferences, and an organization chart associated with each user of a plurality of users. The meeting server selects a first user and a second user for a social encounter based on the calendar data, user preferences, and roles in the organization chart. The meeting server prompts a first user device associated with the first user, and a second user device associated with the second user, for a social encounter. Responsive to obtaining acceptances from the first user and the second user, the meeting server facilitates the social encounter between the first user and the second user.

20 Claims, 8 Drawing Sheets

(56) References Cited

U.S. PATENT DOCUMENTS

| | | | |
|---|---|---|---|
| 2010/0198742 A1 | 8/2010 | Chang et al. | |
| 2011/0004501 A1* | 1/2011 | Pradhan | G06Q 10/109 |
| | | | 715/757 |
| 2011/0289433 A1 | 11/2011 | Whalin et al. | |
| 2011/0320536 A1* | 12/2011 | Lobb | G06Q 50/01 |
| | | | 709/205 |
| 2012/0053980 A1 | 3/2012 | Basson et al. | |
| 2012/0290950 A1* | 11/2012 | Rapaport | H04L 51/52 |
| | | | 715/753 |
| 2012/0296973 A1* | 11/2012 | Spivak | G06Q 10/02 |
| | | | 709/204 |
| 2014/0047509 A1* | 2/2014 | Bhogal | G06F 21/6218 |
| | | | 726/4 |
| 2014/0074536 A1 | 3/2014 | Meushar et al. | |
| 2015/0156268 A1* | 6/2015 | Lev | H04W 4/12 |
| | | | 709/204 |
| 2017/0109709 A1* | 4/2017 | Wu | G06F 16/358 |
| 2018/0007100 A1* | 1/2018 | Krasadakis | G06Q 10/1095 |

* cited by examiner

ENABLING SPONTANEOUS SOCIAL ENCOUNTERS IN ONLINE OR REMOTE WORKING ENVIRONMENTS

CROSS-REFERENCE TO RELATED APPLICATIONS

This application is a continuation of U.S. application Ser. No. 17/324,562, filed May 19, 2021, the entirety of which is hereby incorporated by reference herein.

TECHNICAL FIELD

The present disclosure relates to meeting scheduling, especially for a remote workforce.

BACKGROUND

Social interaction is important to humans, even in work environments where most of the work is performed individually. Spontaneous encounters, such as bumping into a coworker in a shared space, provide opportunities to discover new projects and make new connections with other people. In a remote working environment, spontaneous social interaction is minimized by the lack of proximity and shared spaces for coworkers. Social interaction in a remote workplace may be maintained through pre-planned video, voice, and/or text chat platforms, but the remote workplace presents challenges to spontaneous interactions. Presence indicators may provide a user with the ability to see if another party is busy before attempting to contact them, but the interactions still require a conscious effort to seek out the interaction and then check the presence indicator of the other party.

DESCRIPTION OF EXAMPLE EMBODIMENTS

Overview

A computer-implemented method is provided for facilitating a spontaneous social encounter in a remote work or online environment. The method includes obtaining calendar data associated with each user of a plurality of users. The method also includes obtaining user preferences associated with each user of the plurality of users. The method further includes prompting a first user device associated with a first user and a second user device associated with a second user for a social encounter based on the calendar data and the user preferences. Responsive to obtaining acceptances from the first user and the second user, the method includes facilitating the social encounter between the first user and the second user.

Example Embodiments

The techniques described herein enable spontaneous social encounters, especially in a remote work environment. The techniques enable two or more users to connect with each other dynamically and spontaneously. The spontaneity of the interaction allows a remote work experience to more closely resemble the in-person office environment and enables remote coworkers to maintain a camaraderie with each other. However, completely random social encounters would be disruptive and unproductive for coworkers. The meeting system described herein takes multiple factors into account to encourage meaningful, spontaneous social interactions.

Figure 1:
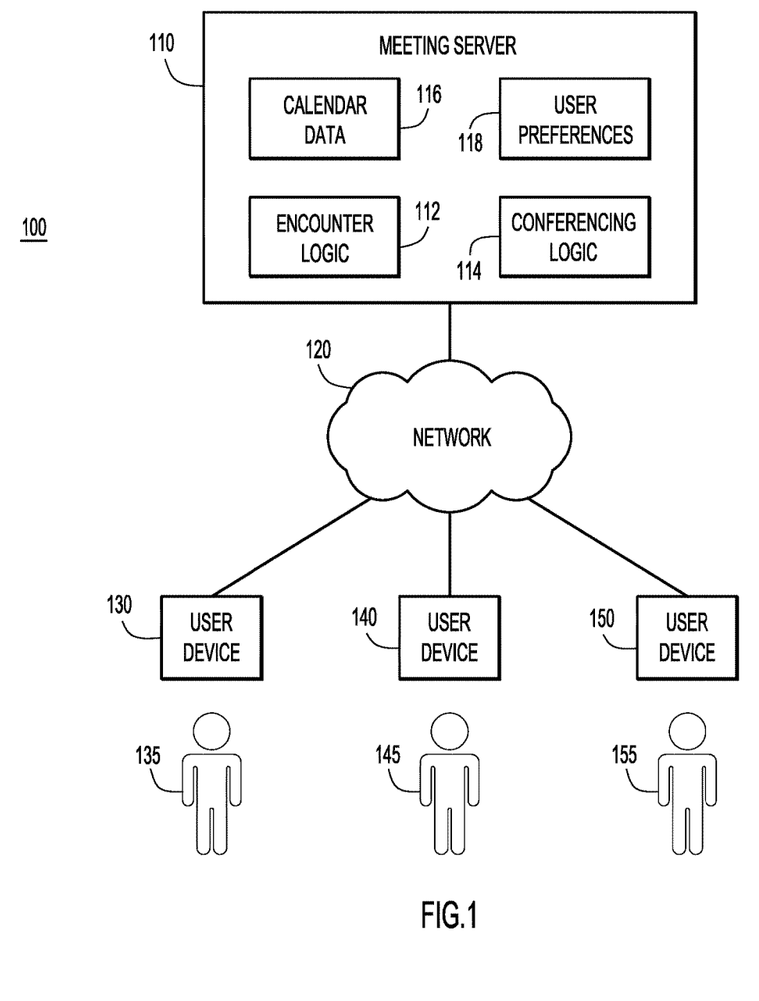
FIG. 1 is a simplified block diagram of an online meeting system, according to an example embodiment.

Referring now to FIG. 1, a meeting system 100 is described that prompts users to engage in spontaneous social encounters. A meeting server 110 coordinates the meeting system 100, and includes encounter logic 112, conferencing logic 114, calendar data 116, and user preferences 118. The encounter logic 112 enables the meeting server 110 to determine which users to select for a social encounter, and enables the meeting server 110 to prompt each user about the social encounter. The conferencing logic 114 enables the meeting server 110 to facilitate social encounters through online conferences, such as video and/or voice chat meetings. The calendar data 116 includes availability data for each of the users registered with the meeting system 100. In some embodiments, the calendar data 116 may be maintained by a separate calendar server/service. The user preferences 118 includes data from each user about how they prefer to interact with other users through the meeting system 100. For instance, the user preferences 118 associated with a particular user may indicate preferences for how to interact with specific users (e.g., games with some users and short video calls with other users) as well as a general preference for the timing of spontaneous interactions (e.g., morning or afternoon) and the frequency of interactions (e.g., once per week) facilitated by the meeting system 100.

The meeting server 110 is connected to a network 120, which may include one or more computer networks. A user device 130 associated with a user 135 connects to the meeting server 110 through the network 120. Similarly, user devices 140 and 150 associated with users 145 and 155, respectively, connect to the meeting server 110 through the network 120. Additional users may connect to the meeting server 110, and each user may be associated with more than a single user device.

In one example, the calendar data 116 for a specific user (e.g., user 135) may be obtained from the user device 130 or from other computing devices on which the user 135 may be registered (e.g., a cloud-hosted calendar system). The calendar data 116 for the user 135 may include a schedule of planned meetings including the user 135, a listing of other users (e.g., users 145 or 155) in meetings with the user 135, a record of past spontaneous encounters involving the user 135, and/or presence information for the user 135. Additionally, the user 135 may indicate particular times as dedicated spontaneity times as part of the calendar data 116 that is stored associated with the user 135.

In another example, the user preferences 118 for a specific user (e.g., user 135) may be provided by the user 135 through the user device 130 or from other computing devices on which the user 135 may be registered. The user preferences 118 associated with the user 135 may include contact data for contacts (e.g., coworkers, friends, teammates, etc.) of the user 135, user interests of the user 135 (e.g., games, hobbies, sports, travel destinations, art/literature preferences, etc.), encounter preferences for social encounters (e.g., one-one-one, small group, video, text chat, types of engagement activities, etc.), a list of other users (e.g., user 145) with which the user 135 would like to prioritize having a social encounter, or a list of other users (e.g., user 155) with which the user 135 would like to exclude from future social encounters. Additionally, the user preferences 118 may indicate specific times of the day during which the user 135 is available to participate in spontaneous social encounters. Alternatively, the user 135 may allow the meeting server 110 to determine the timing of any spontaneous social encounters.

In a further example, the encounter logic 112 may enable the meeting server 110 to promote the casual aspect of the social encounters by optionally providing social encounters with a predetermined duration. The predetermined duration may be short enough (e.g., 10 minutes) to provide the users with confidence that they will not be trapped in the social encounter for too long. Additionally, the conferencing logic 114 may provide a countdown timer to provide participants with a visual cue of the time remaining in the social encounter. The conferencing logic 114 may also provide an engagement activity (e.g., a game, discussion topic, etc.) for the participants in the social encounter.

In still another example, system administrators of the meeting system 100 may selectively enable or disable features (e.g., engagement activities, small group encounters, etc.) of the meeting system 100 or set values (e.g., encounter duration, encounter frequency, etc.) for the meeting system 100. Alternatively, users may be able to set their personal preferences for features and values in the user preferences 118.

Figure 2:
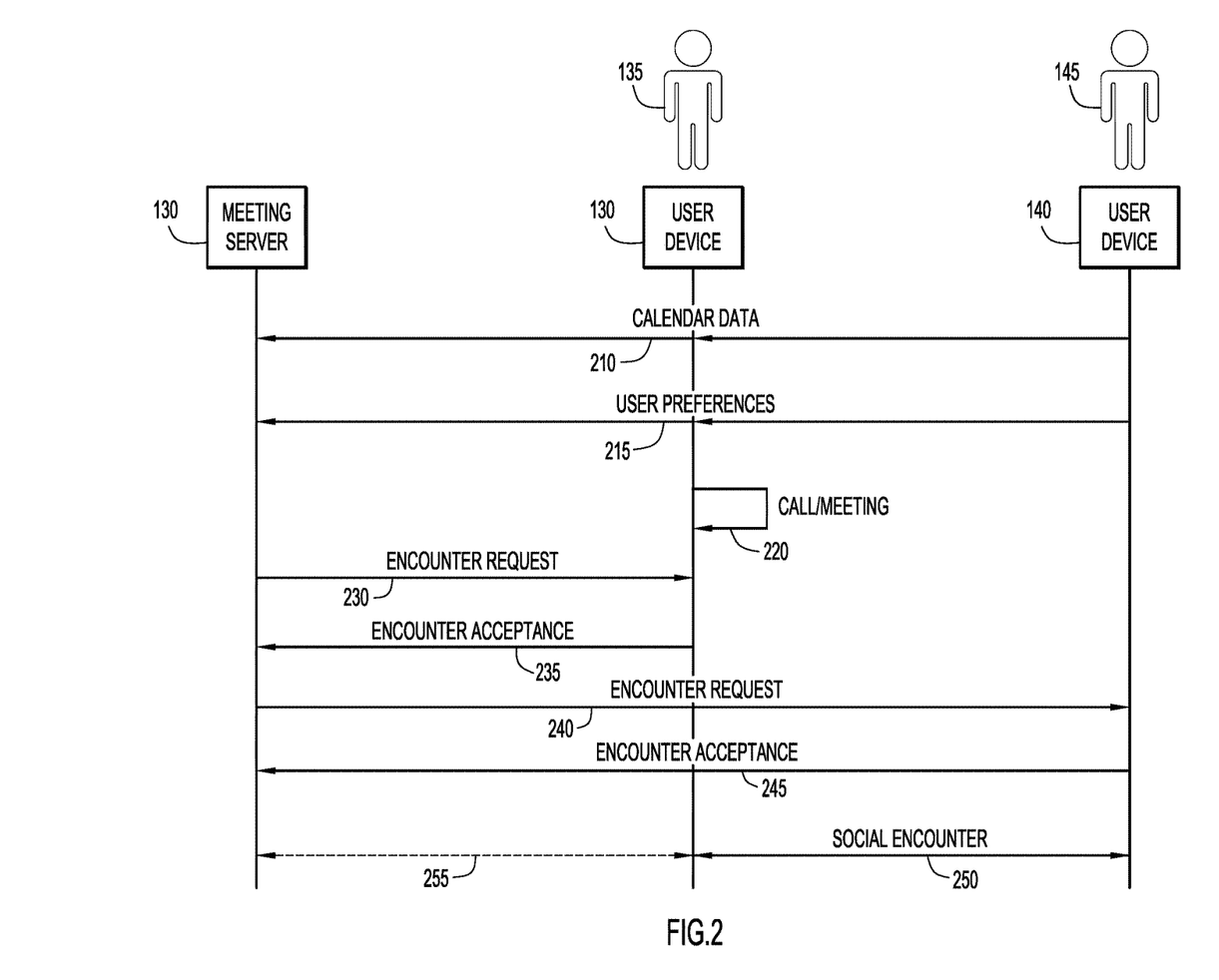
FIG. 2 is a message flow diagram illustrating a meeting server initiating a spontaneous social encounter between two users, according to an example embodiment.

Referring now to FIG. 2, a message flow diagram illustrates an example of the meeting server 110 facilitating a spontaneous social encounter between user 135 and user 145. The meeting server 110 collects calendar data 210 from the user devices 130 and 140, which are associated with the users 135 and 145, respectively. Similarly, the meeting server 110 collects user preferences 215 for the users 135 and 145 from the user device 130 and 140, respectively. In one example, the calendar data 210 includes a scheduled call 220 for which the user 135 has blocked off time. In another example, the calendar data 210 and/or user preferences 215 may be collected from the user devices 135 and 145 through a separate service (e.g., a cloud-based service).

Based on the calendar data 210 and the timing of the scheduled call 220, the meeting server determines that the user 135 may be available for a spontaneous social encounter after the scheduled call 220. At the end of the scheduled call 220, the meeting server 110 sends an encounter request 230 to the user device 130. In one example, the meeting server may wait for a predetermined length of time (e.g., 5-10 minutes) after the end of the scheduled call 220 to allow buffer time around meetings. The encounter request 230 identifies the user 145 as the other participant in the social encounter.

After the meeting server 110 receives the encounter acceptance from the user device 130, the meeting server 110 sends a corresponding encounter request 240 to the user device 140 associated with the user 145. Alternatively, the meeting server 110 may send the encounter request 240 to the user device 140 before receiving the encounter acceptance 235 from the user device 130. If the user 145 agrees to the social encounter, the user 145 causes the user device 140 to send the encounter acceptance 245 to the meeting server 110.

Once the meeting server 110 receives the encounter acceptance 235 from the user device 130 and the encounter acceptance 245 from the user device 140, the user device 130 and the user device 140 proceed with the social encounter 250. In one example, the social encounter 250 may be facilitated by the meeting server 110 by an interaction 255. For instance, the messages in the social encounter 250 may be part of an online conference session mediated by the meeting server 110. Alternatively, the meeting server 110 may facilitate a direct peer-to-peer social encounter 250 between the user device 130 and the user device 140.

In another example, if the user 145 declines the spontaneous social encounter (i.e., the user device 140 does not send the encounter acceptance 245), then the meeting server 110 may select a different user for the social encounter with the user 135. Additionally, the meeting server 110 may add further users to the social encounter 250 if both the user 135 and the user 145 agree to a small group encounter instead of a one-on-one interaction.

Figure 3A:
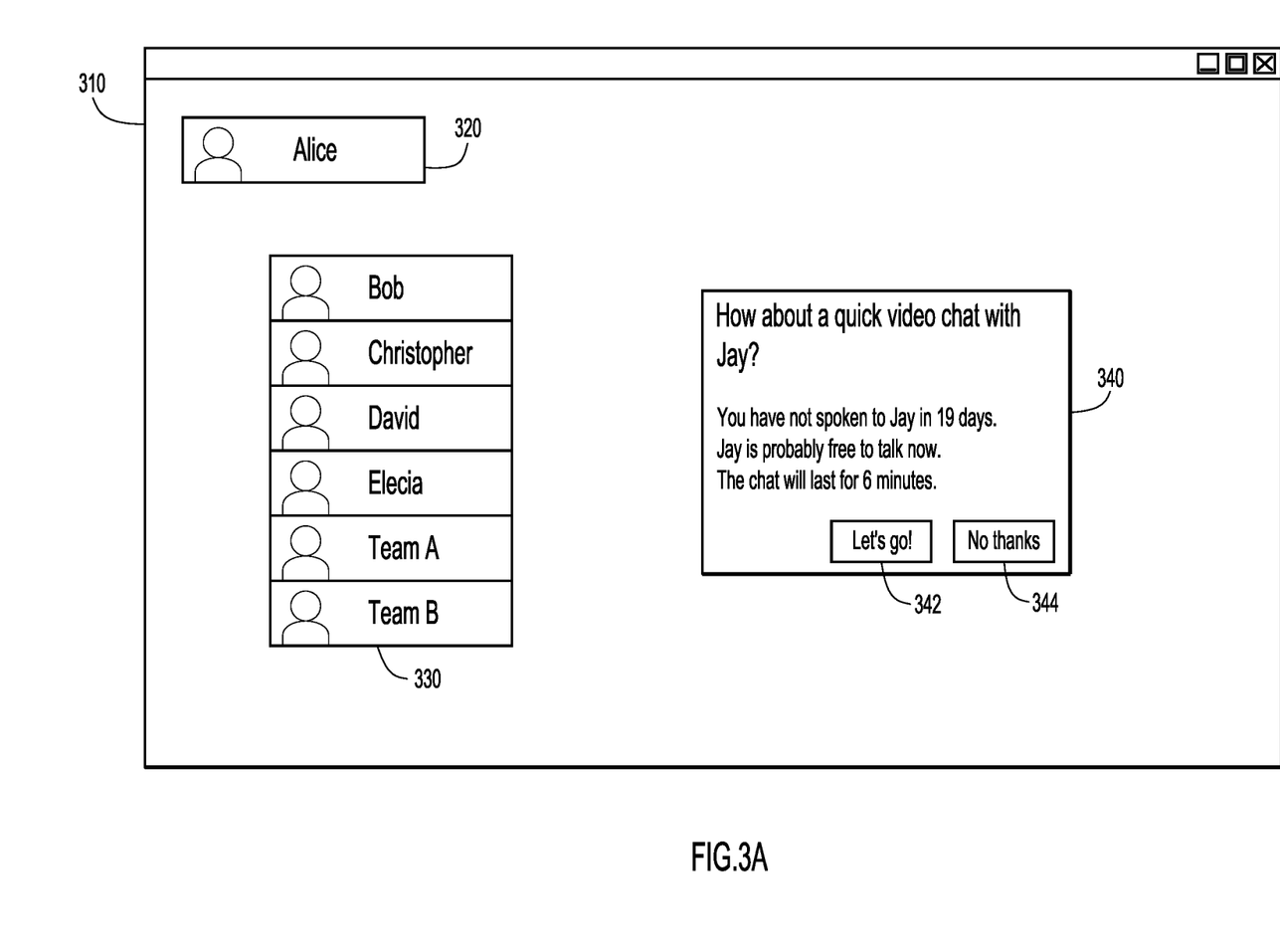
FIG. 3A is a screenshot of a prompt for a user to have a spontaneous interaction, according to an example embodiment.

Referring now to FIG. 3A, a simulated screenshot illustrates a window of a conferencing application 310 prompting a user 320 (e.g., Alice) for a spontaneous social encounter. The conferencing application 310 includes a contact list 330 with individual contacts (e.g., Bob, Christopher, David, and Elecia) and group contacts (e.g., Team A and Team B). The contact list 330 may display the presence information of each individual contact, and/or whether a conference with each contact includes unread messages.

To prompt the user 320 for a spontaneous social encounter, the conferencing application 310 displays a dialog box 340 that identifies another user (e.g., Jay) that the meeting system 100 has been matched with the user 320 for the social encounter. The dialog box 340 may include information about the other user (e.g., an amount of time since the two users have communicated, common interests between the users, the likelihood of the other user accepting a spontaneous social encounter, etc.) and/or information about the social encounter (e.g., the predetermined length of the social encounter, suggested engagement activities, topics for discussion, etc.). The user 320 may accept the invitation to the social encounter by pressing the button 342 in the dialog box 340. Alternatively, the user 320 may reject the invitation by pressing the button 344 in the dialog box 340.

In one example, the meeting system 100 attempts to mimic the non-committal environment of someone walking into a break room and having the option of simply nodding (i.e., acknowledging their coworker and moving on) or stopping for a conversation (i.e., engaging with the coworker). One method of ensuring a light and non-committal environment is to enforce a fixed meeting length (e.g., 5-7 minutes) that is not extendable by the users. A countdown timer may be displayed to the participants of the social encounter in the invitation to the social encounter and/or during the social encounter itself. Any user wishing the meeting would end only needs to wait a few short minutes. If a user wants to extend the meeting, then the user is directed to call back and/or schedule a planned meeting to follow the spontaneous social encounter. The fixed duration of the spontaneous social encounter provides each participant confidence that accepting the invitation will not trap them with another user for an extended period of time.

Figure 3B:
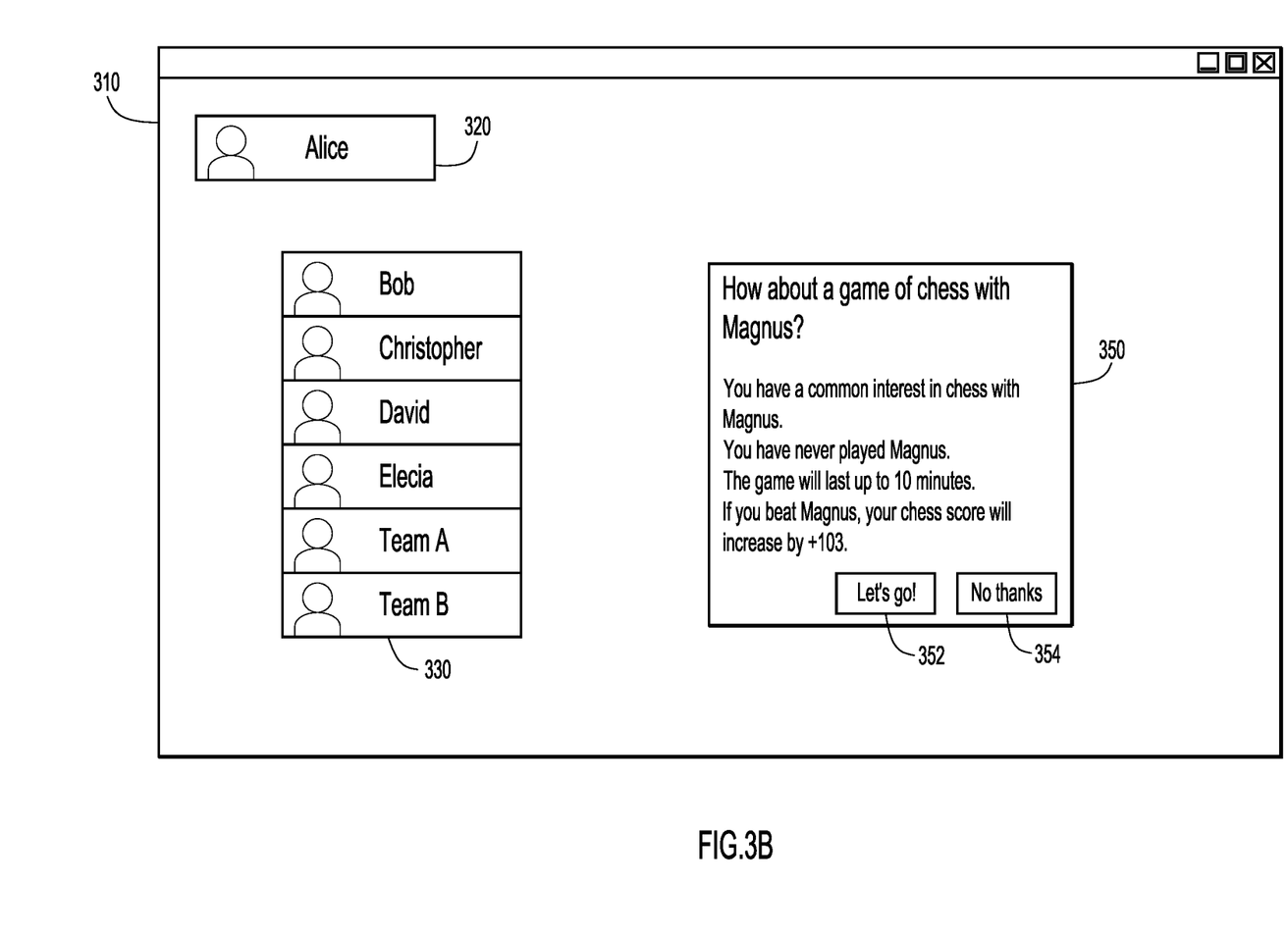
FIG. 3B is a screenshot of a prompt for a user to have a spontaneous interaction with a suggested engagement activity, according to an example embodiment.

The meeting system 100 may also increase user engagement with the spontaneous social encounter by using engagement activities, such as games. Referring now to FIG. 3B, a simulated screenshot illustrates a prompt for a spontaneous social encounter with a specific game invitation. In the example shown in FIG. 3B, the conferencing application 310 displays a dialog box 350 to prompt the user 320 (e.g., Alice) to participate in a game with another user (e.g., Magnus). The user 320 may accept the invitation to the game by pressing the button 352 in the dialog box 350. Alternatively, the user 320 may reject the invitation by pressing the button 354 in the dialog box 350.

The game selected for the engagement activity, such as chess, may be based on a common interest in the game by both participants selected for the social encounter. Additionally, a specific time limit for the game may be used as a maximum length of the social encounter. For instance, a chess game may use a time clock to ensure the total time of the game does not intrude too far into the workday. In another example, the meeting system 100 may maintain a scoreboard for games between users, and the dialog box 350 inviting the user 320 to the game may include potential changes to the rankings as encouragement to accept the invitation to play the game. Prizes may be provided based on the scoreboard to further attract user engagement with the social encounters.

Other engagement activities may be cooperative (e.g., solving a virtual jigsaw puzzle) or competitive (e.g., trivia competitions). The engagement activities may be selected by the meeting system 100 based on records of previous responses to engagement activities. For instance, if one user typically accepts invitations for a game of chess, but rejects invitations for a game of cribbage, then the meeting system 100 may determine that chess is a more effective engagement activity for that user. Alternatively, the meeting system 100 may store specific user preferences provided by the users that indicate which engagement activities each user is likely to accept.

In another example, the meeting system 100 may select users to participate in a spontaneous social encounter as a way for new employees to be introduced to their coworkers. In the physical world, a technical lead or manager would typically take a new employee from office to office to introduce them to their new coworkers. The spontaneous social encounters through the meeting system 100 provides a mechanism to accomplish a similar function in a virtual workplace environment. A new employee may indicate that they are new and want an introduction to coworkers, and the meeting system 100 may prioritize spontaneous social encounters for the new employee and match them with appropriate team leaders and coworkers. Additionally, in this mode, the user who is matched with the new employee may be notified in the invitation that the social encounter is with a new employee.

In a further example, the meeting system 100 may provide icebreaker exercises as an engagement activity to enable users to learn more about each other. The meeting system 100 may provide each user with interesting facts that serve as icebreakers to begin a dialog between the users. For instance, the meeting system 100 may indicate to one or both users in a social encounter that other participant shares a common interest (e.g., travelling, football, etc.), or that the participants share a common trait (e.g., they both previously worked for the same employer, or both lived in the same city). Alternatively, the meeting system 100 may pose a series of general questions for each user to answer as a way of getting to know each user.

Figure 4A:
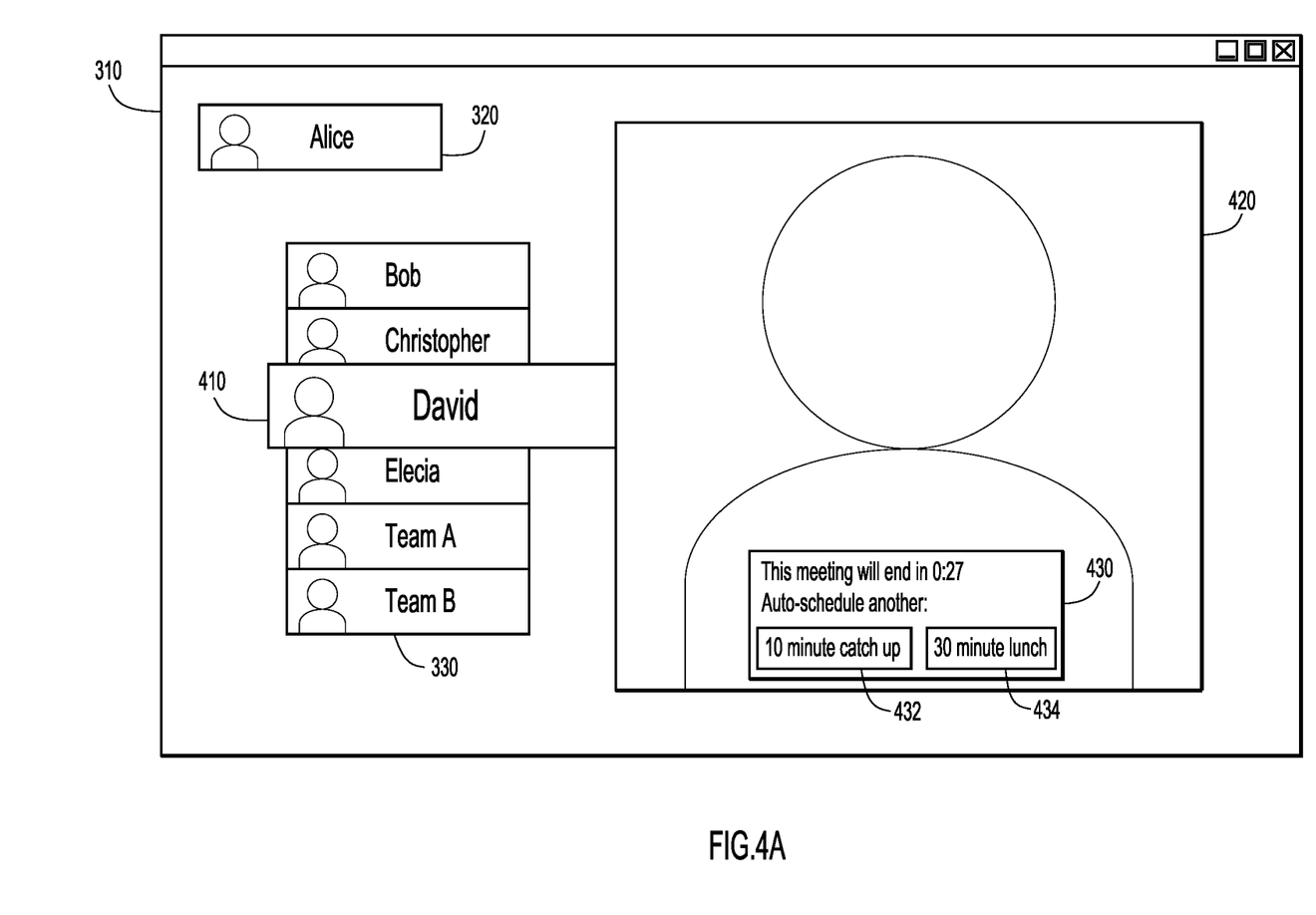
FIG. 4A is a screenshot of a follow-up prompt to a spontaneous social encounter, according to an example embodiment.

Referring now to FIG. 4A, a simulated screenshot of a social encounter illustrates how the meeting system 100 may provide an option to schedule a follow-up to the spontaneous social encounter. The meeting system 100 limits the duration of the spontaneous social encounters to promote engagement, but the participants in the spontaneous encounter may want to continue the discussion in a follow-up meeting. In the screenshot shown in FIG. 4A, a user 320 (e.g., Alice) is in a spontaneous social encounter with another user 410 (e.g., David). The conferencing application 310 includes a video chat feature 420 as part of the social encounter.

As the social encounter approaches the end of the predetermined duration, the conferencing application 310 may display a pop-up box 430 to allow the user 320 to indicate whether the user would like to schedule a follow-up meeting at a later date. If the user 320 would like to schedule another short meeting, then the user 320 may press the button 432 of the pop-up box 430. If the user 320 would prefer a longer meeting over lunch, then the user 320 may press the button 434 of the pop-up box 430. In other examples, additional options may be provided for follow-up meetings, such as specific date and/or time options, varying duration meetings, and/or additional participants to invite to the follow-up meeting.

Figure 4B:
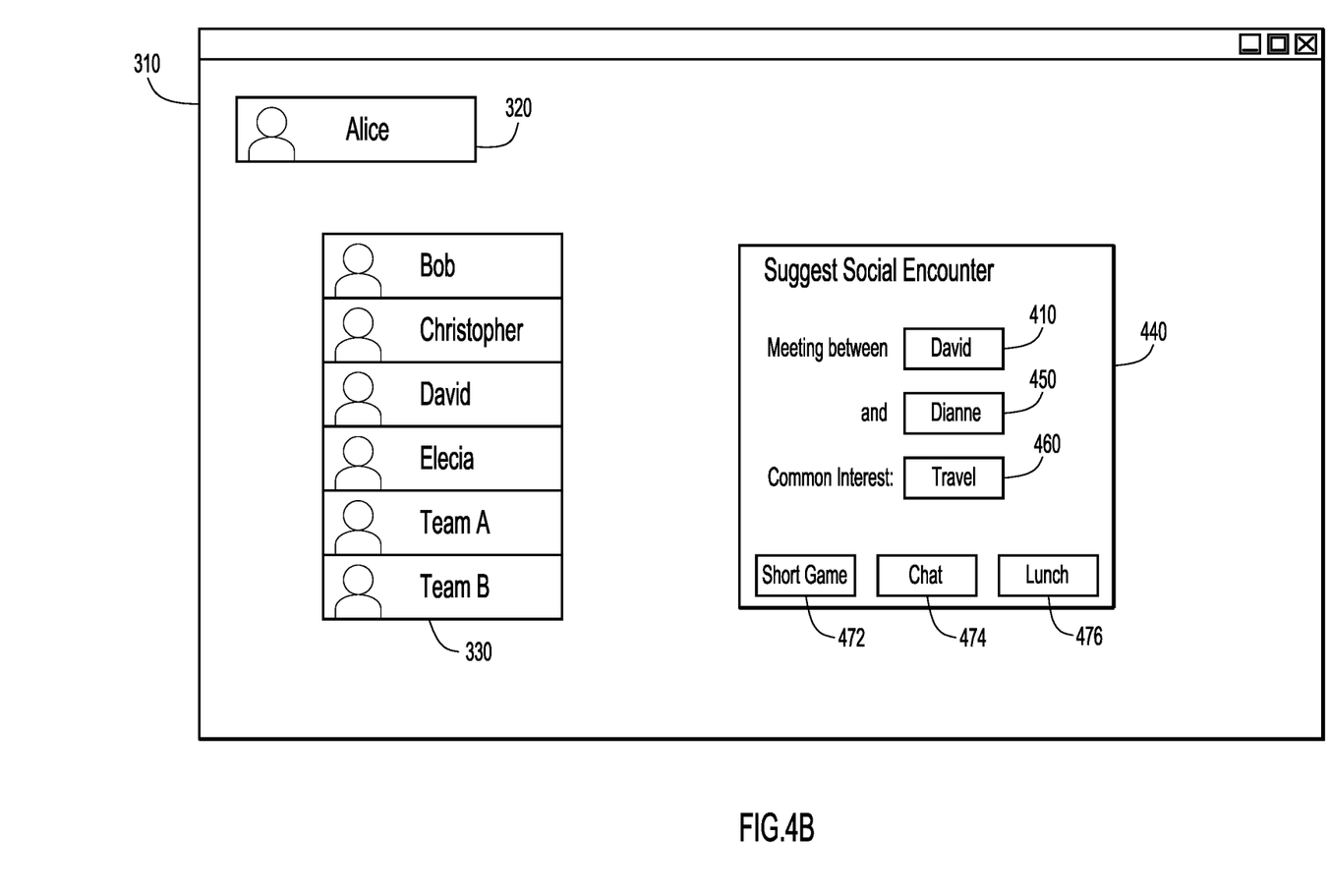
FIG. 4B is a screenshot of a prompt to suggest a social encounter with between users, according to an example embodiment.

Referring now to FIG. 4B, a simulated screenshot illustrates a prompt for a user 320 (e.g., Alice) to suggest potential users for the meeting system 100 to match in a spontaneous social encounter. The conferencing application 310 includes a dialog box 440 for suggesting social encounters between two or more users. In the example shown in FIG. 4B, the user 320 uses the dialog box 440 to suggest a social encounter between a user 410 (e.g., David) and a user 450 (e.g., Dianne). The dialog box 440 also includes an entry 460 to indicate a reason (e.g., a common interest in travel) that the user 410 and the user 450 would be likely to engage with each other in a spontaneous social encounter. The user 320 may suggest a particular type of social encounter for the user 410 and the user 450 by selecting button 472 to suggest a short game, selecting button 474 for a ten minute video chat, or selecting button 476 for a lunch meeting.

In one example, after the user 320 selects the user 410 for a potential spontaneous social encounter, the meeting system 100 may automatically generate suggestions of other users (e.g., user 450) that may be appropriate for a spontaneous social encounter with the selected user 410. For instance, the user 320 may want to suggest that the user 410 would benefit from a spontaneous social encounter with someone, but may not know other users' interests to be able to suggest a specific user.

The meeting system 100 may leverage many factors in determining which users to match for a spontaneous social encounter. In one example, the meeting system may use the role/location of each user in a company organization chart to match users who are neighbors in the organization (e.g., coworkers with similar job functions) or to encourage interaction across the layers of the organization (e.g., supervisors and direct reports). For instance, users who are part of a virtual team working together on a virtual project may be more likely to be selected for a spontaneous social encounter.

In another example, the meeting system 100 may match users based on similar user interests, which may be work related or non-work related. For instance, each user may be given an opportunity to submit their interests in a questionnaire when they are hired to an organization and/or at periodic intervals to ensure their current interests are stored by the meeting system 100. Additionally, the meeting system 100 may automatically determine user interests based on each user's job title and job function.

An individual user may also provide a list of other users to specifically exclude from spontaneous social encounters. For instance, if two users live in the same house and already speak to each other every day, these users may want to prevent the meeting system 100 from matching them in a spontaneous social encounter. Additionally, a user may provide a list of other users that they would like to meet, which enables the meeting system 100 to prioritize that spontaneous social encounter. As described with respect to FIG. 4B, users may also provide suggestions for other users who may benefit from a spontaneous social encounter.

Additionally, the meeting system 100 may match users for a spontaneous social encounter based on their history of social encounters. For instance, the meeting system 100 may avoid repeatedly matching the same users for a spontaneous social encounter to avoid interaction fatigue. The meeting system 100 may have a cool down timer for social encounters between two users after they have finished a social encounter. Alternatively, the users may indicate that the social encounter went well, enabling the meeting system 100 to prioritize additional social encounters between those users.

In another example, a user may explicitly invoke the meeting system 100 by designating themselves as "on break" and available for a social encounter. By designating themselves as available for a social encounter, the users are opting in to the meeting system 100, rather than relying on the meeting system 100 determining an appropriate time to suggest a spontaneous social encounter. Opting in to the meeting system 100 allows the users to determine the timing of the social encounter, while relying on the meeting system 100 to determine the participants of the social encounter, with potential input from the users (e.g., with a list of users to match for the social encounter.

In a further example, the meeting system 100 may pre-match users for a social encounter based on calendar data, and suggest a social for a future time. Pre-scheduling the social encounters removes some of the spontaneity from the social encounter, but enables users with busy work schedules to participate in some social encounters.

In still another example, the meeting system 100 may allow users to choose to be alerted for a social encounter with a friend whenever the friend designated himself/herself as available. This alert allows the user to decide to also designate themselves as available (e.g., take a break) at the same time as their friend. This mechanism enables the meeting system 100 to mimic the real world behavior of the user seeing their coworker heading to the break room, and deciding that it is a good time to take a break also.

Figure 5:
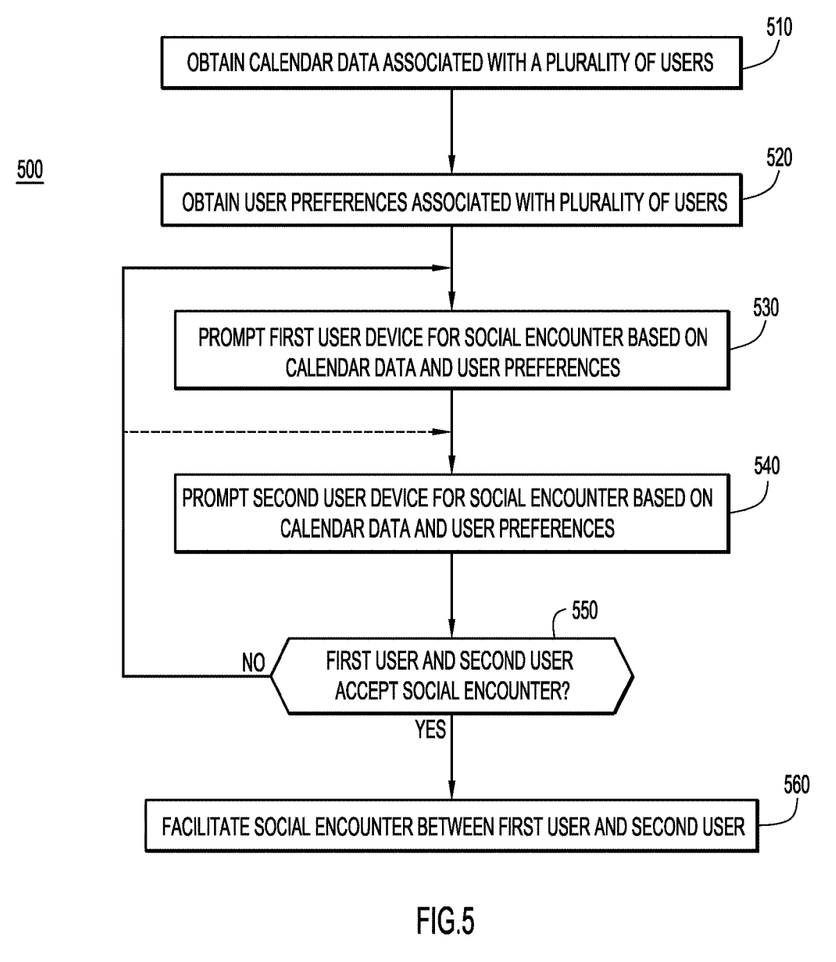
FIG. 5 is a flowchart illustrating operations performed on a meeting server to facilitate spontaneous social encounters between users, according to an example embodiment.

Referring now to FIG. 5, a flowchart illustrates operations performed by a meeting server (e.g., meeting server 110) in a process 500 to match users for a spontaneous social encounter. At 510, the meeting server obtains calendar data from a plurality of users. In one example, the calendar data may include the schedule of individual users and/or a record of previously facilitated social encounters. At 520, the meeting server obtains user preferences associated with the plurality of users. In one example, the user preferences include user interests, preferences for types of social encounters, preferences for participants in social encounters, and/or preferences for the timing of social encounters.

At 530, the meeting server prompts a first user device associated with a first user for a social encounter based on the calendar data and the user preferences. In one example, the meeting server may select at least one other user for the social encounter and notify the first user of the identity of the at least one other user. In another example, the meeting server may notify the first user about parameters of the social encounter, such as the predetermined duration of the encounter, attributes of at least one other user selected for the social encounter, or an engagement activity for the social encounter.

At 540, the meeting server prompts a second user device associated with a second user for the social encounter based on the calendar data and the user preferences. In one example, the meeting server may wait to prompt the second user device for the social encounter until after the first user has accepted the prompt for the social encounter. In another example, the meeting server may notify the second user about parameters of the social encounter, such as the predetermined duration of the social encounter, attributes of at least one other user (e.g., the first user) selected for the social encounter, or an engagement activity for the social encounter.

At 550, the meeting server determines whether the first user and the second user have accepted the social encounter. If one or both of the users (e.g., the first user and the second user) decline the prompt for the social encounter, the meeting server selects at least one new user and returns to either 530 or 540 to prompt the new users for the social encounter. For instance, if the second user declines the prompt for the social encounter, the meeting server may select a different user to have the social encounter with the first user. If both the first user and the second user accept their respective prompts for the social encounter, then the meeting server facilitates the social encounter between the first user and the second user at 560

In one example, the meeting server may wait a short period of time (e.g., 1-2 minutes) for each participant (e.g., the first user and the second user) to respond to their respective prompts for the social encounter before selecting different users for the social encounter. In another example, the meeting server may facilitate the social encounter by starting an online conferencing session. The online conferencing session may include video, voice, text, or other means of communicating between two remote users. The meeting server may mediate the online conferencing session between the first user device and the second user device. Alternatively, the first user and/or the second user may join the online conferencing session with a separate device (e.g., a dedicated telepresence device or a smartphone). For instance, a user may respond to the prompt for the social encounter by sending an acceptance message from their respective user device indicating that they will join the social encounter from a separate device.

In a further example, the first user and/or the second user may send their response to the prompt for the social encounter via the first user device or the second user device. Alternatively, the first user and/or the second user may respond to the prompt for the social encounter using a separate device (e.g., a telepresence device).

Figure 6:
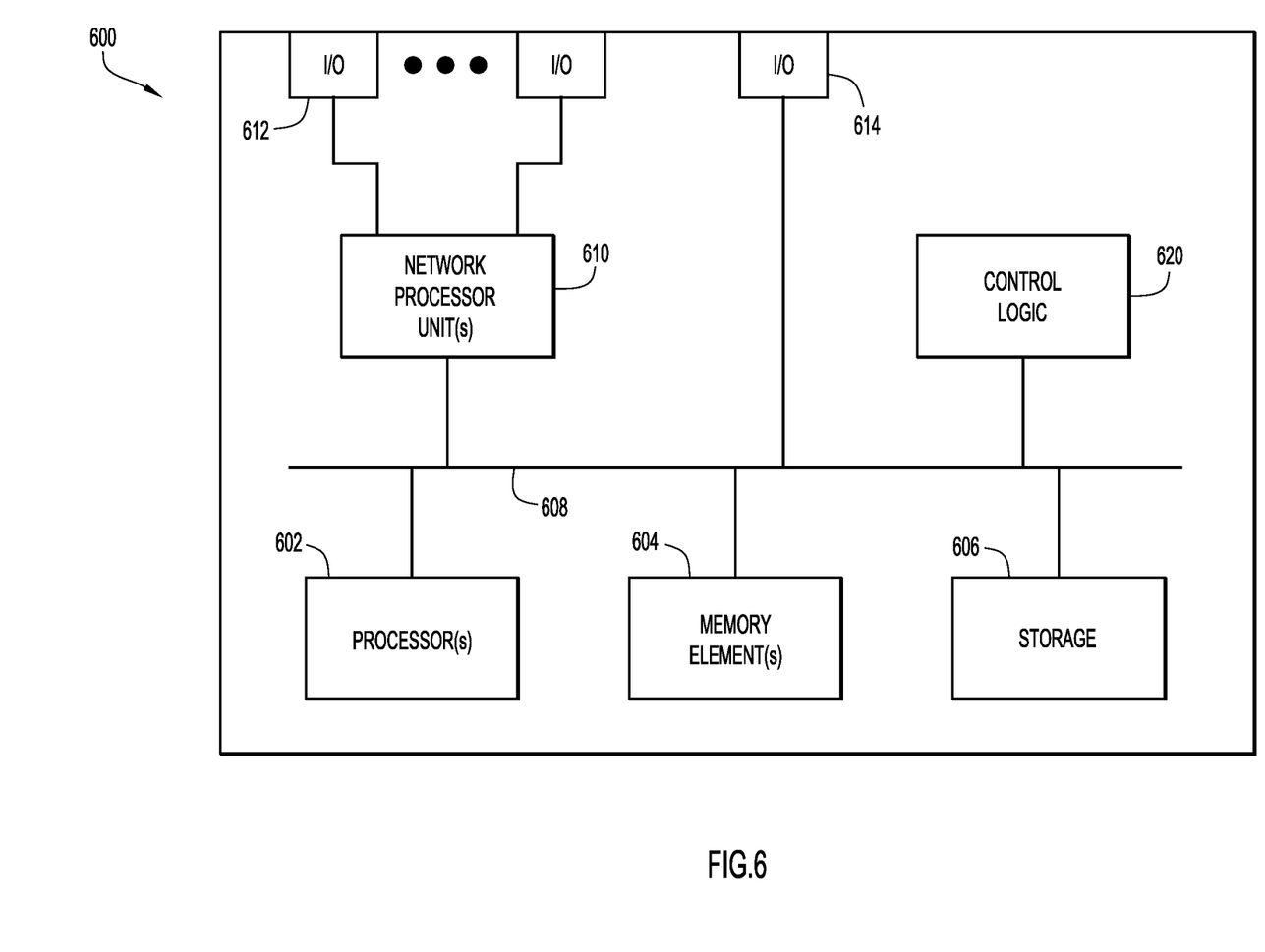
FIG. 6 illustrates a simplified block diagram of a device that may be configured to perform the methods presented herein, according to an example embodiment.

Referring to FIG. 6, FIG. 6 illustrates a hardware block diagram of a computing device 600 that may perform functions associated with operations discussed herein in connection with the techniques depicted in FIGS. 1, 2, 3A, 3B, 4A, 4B, and 5. In various embodiments, a computing device, such as computing device 600 or any combination of computing devices 600, may be configured as any entity/ entities as discussed for the techniques depicted in connection with FIGS. 1, 2, 3A, 3B, 4A, 4B, and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques described herein provide for complementary ways to enable spontaneous social encounters, especially in a remote work environment. The meeting system enables two or more users to connect with each other dynamically and spontaneously in a fun, light, and non-committal way when they are not explicitly in a meeting or otherwise busy. The spontaneity of the meeting system enables a remote work environment to be closer to the real world (e.g., in-office) work environment. The meeting system also provides a way for newly hired employees to be virtually introduced to coworkers and company leadership in a light and unhindered way.

The meeting system provides the ability for users to use their presence information to signal that they are "on break" and available for a spontaneous social encounter with one or more peers/friends. The meeting system also provides the ability to match up team members, friends, or other coworkers when both are designated as being "on break" at the same time. Additionally, the meeting system may notify an interested party when their friend goes "on break" to allow the interested party to decide whether to join their friend in a social encounter.

The meeting system mimics a real world scenario of bumping into friends and coworkers in the hallway or break room by automatically initiating a short, dynamic meeting. New hires may be introduced to the leadership team or to their own team through a prioritized social encounter. The meeting system includes logic to review historical data of social encounters to ensure that any set of users is not matched too frequently or too rarely for effective social interaction. The meeting system examines user interests of various users, and may match users for a spontaneous social encounter based on similar user interests.

In one form, a computer-implemented method is provided for facilitating a spontaneous social encounter. The method includes obtaining calendar data associated with each user of a plurality of users. The method also includes obtaining user preferences associated with each user of the plurality of users. The method further includes prompting a first user device and a second user device for a social encounter based on the calendar data and the user preferences. The first user device is associated with the first user and the second user device is associated with the second user. Responsive to obtaining acceptances from the first user and the second user, the method includes facilitating the social encounter between the first user and the second user.

In another form, an apparatus comprising a network interface and a processor is provided. The network interface is configured to communicate in a computer network. The processor is coupled to the network interface, and configured to obtain calendar data and user preferences associated with each user of a plurality of users. The processor is also configured to prompt a first user device and a second user device, via the network interface, for a social encounter based on the calendar data and the user preferences. The first user device is associated with the first user and the second user device is associated with the second user. Responsive to obtaining acceptances from the first user and the second user, the processor is configured to facilitate the social encounter between the first user and the second user.

In still another form, a non-transitory computer readable storage media is provided that is encoded with instructions that, when executed by a processor, cause the processor to obtain calendar data and user preferences associated with each user of a plurality of users. The instructions also cause the processor to prompt a first user device and a second user device for a social encounter based on the calendar data and the user preferences. The first user device is associated with the first user and the second user device is associated with the second user. Responsive to obtaining acceptances from the first user and the second user, the instructions cause the processor to facilitate the social encounter between the first user and the second user.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining calendar data associated with each user of a plurality of users;
obtaining user preferences associated with each user of the plurality of users;
obtaining an organization chart associating roles with each user of the plurality of users;
selecting a first user and a second user among the plurality of users for a social encounter, the first user and the second user selected based on the calendar data, the user preferences, and the organization chart, wherein the organization chart associates a first role with the first user and a second role with the second user;

providing a first prompt to a first user device associated with the first user for the social encounter;

providing a second prompt to a second user device associated with the second user for the social encounter; and responsive to obtaining acceptances from the first user device and the second user device, facilitating the social encounter between the first user and the second user.

2. The method of claim 1, wherein the first role designates the first user as a new hire.

3. The method of claim 2, wherein the second role designates the second user as one or more of a supervisor of the first user, a direct report to the first user, or a coworker with a similar job function to the first user.

4. The method of claim 1, further comprising providing a third prompt to one or more third user devices associated with corresponding one or more third users.

5. The method of claim 1, wherein providing the first prompt to the first user device is based on previously facilitated social encounters between the first user and the second user.

6. The method of claim 1, wherein the user preferences include listings of user interests associated with each user of the plurality of users.

7. The method of claim 6, wherein the first prompt and the second prompt include an indication of a common interest selected from a listing of user interests associated with the first user and a listing of user interests associated with the second user.

8. An apparatus comprising:
a network interface configured to communicate in a computer network; and
a processor coupled to the network interface, the processor configured to:
obtain calendar data associated with each user of a plurality of users;
obtain user preferences associated with each user of the plurality of users;
obtain an organization chart associating roles with each user of the plurality of users;
select a first user and a second user among the plurality of users for a social encounter, the first user and the second user selected based on the calendar data, the user preferences, and the organization chart, wherein the organization chart associates a first role with the first user and a second role with the second user;
cause the network interface to provide a first prompt to a first user device associated with the first user for the social encounter;
cause the network interface to provide a second prompt to a second user device associated with the second user for the social encounter; and
responsive to obtaining acceptances from the first user device and the second user device, facilitate the social encounter between the first user and the second user.

9. The apparatus of claim 8, wherein the first role designates the first user as a new hire.

10. The apparatus of claim 9, wherein the second role designates the second user as one or more of a supervisor of the first user, a direct report to the first user, or a coworker with a similar job function to the first user.

11. The apparatus of claim 8, wherein the processor is further configured to cause the network interface to provide a third prompt to one or more third user devices associated with corresponding one or more third users.

12. The apparatus of claim 8, wherein the processor is configured to cause the network interface to provide the first prompt to the first user device based on previously facilitated social encounters between the first user and the second user.

13. The apparatus of claim 8, wherein the user preferences include listings of user interests associated with each user of the plurality of users.

14. The apparatus of claim 13, wherein the first prompt and the second prompt include an indication of a common interest selected from a listing of user interests associated with the first user and a listing of user interests associated with the second user.

15. One or more non-transitory computer readable storage media encoded with software comprising computer executable instructions and, when the software is executed, it is operable to cause a processor to:
obtain calendar data associated with each user of a plurality of users;
obtain user preferences associated with each user of the plurality of users;
obtain an organization chart associating roles with each user of the plurality of users;
select a first user and a second user among the plurality of users for a social encounter, the first user and the second user selected based on the calendar data, the user preferences, and the organization chart, wherein the organization chart associates a first role with the first user and a second role with the second user;
provide a first prompt to a first user device associated with the first user for the social encounter;
provide a second prompt to a second user device associated with the second user for the social encounter; and
responsive to obtaining acceptances from the first user device and the second user device, facilitate the social encounter between the first user and the second user.

16. The one or more non-transitory computer readable storage media of claim 15, wherein the first role designates the first user as a new hire.

17. The one or more non-transitory computer readable storage media of claim 16, wherein the second role designates the second user as one or more of a supervisor of the first user, a direct report to the first user, or a coworker with a similar job function to the first user.

18. The one or more non-transitory computer readable storage media of claim 15, wherein the software is further operable to cause the processor to provide a third prompt to one or more third user devices associated with corresponding one or more third users.

19. The one or more non-transitory computer readable storage media of claim 15, wherein the software is further operable to cause the processor to provide the first prompt to the first user device based on previously facilitated social encounters between the first user and the second user.

20. The one or more non-transitory computer readable storage media of claim 15, wherein the user preferences include listings of user interests associated with each user of the plurality of users.

* * * * *